(12) United States Patent
Cho et al.

(10) Patent No.: US 12,523,894 B2
(45) Date of Patent: Jan. 13, 2026

(54) SEMICONDUCTOR DEVICE, PHOTONIC CIRCUIT, AND METHOD FOR ADJUSTING RESONANT WAVELENGTH OF OPTICAL MODULATOR

(71) Applicant: TAIWAN SEMICONDUCTOR MANUFACTURING COMPANY LTD., Hsinchu (TW)

(72) Inventors: Lan-Chou Cho, Hsinchu (TW); Stefan Rusu, Sunnyvale, CA (US); Ping Chun Yeh, Taichung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 259 days.

(21) Appl. No.: 18/347,533

(22) Filed: Jul. 5, 2023

(65) Prior Publication Data

US 2025/0013084 A1    Jan. 9, 2025

(51) Int. Cl.
*G02F 1/025* (2006.01)

(52) U.S. Cl.
CPC ................. *G02F 1/025* (2013.01)

(58) Field of Classification Search
CPC ...................................... G02G 1/025
See application file for complete search history.

(56) References Cited

U.S. PATENT DOCUMENTS

| | | | | |
|---|---|---|---|---|
| 8,600,201 | B2 * | 12/2013 | Thacker | G02B 6/12007 385/14 |
| 9,235,065 | B1 * | 1/2016 | Zortman | G02F 1/218 |
| 12,293,954 | B2 * | 5/2025 | Shih | G02F 1/015 |
| 2006/0198416 | A1 * | 9/2006 | Yamazaki | H01S 5/1032 372/67 |
| 2007/0206899 | A1 | 9/2007 | Chu et al. | |
| 2007/0211992 | A1 | 9/2007 | Chu et al. | |

(Continued)

FOREIGN PATENT DOCUMENTS

| | | |
|---|---|---|
| CN | 102667578 A | 9/2012 |
| CN | 105492944 A | 4/2016 |

(Continued)

OTHER PUBLICATIONS

U.S. Pat. No. 20230221490A1 is the US counterpart of CN 115917408 A.

(Continued)

*Primary Examiner* — Tina Wong
(74) *Attorney, Agent, or Firm* — WPAT LAW; Anthony King

(57) ABSTRACT

The present disclosure provides a semiconductor device, a photonic circuit, and a method for adjusting a resonant wavelength of an optical modulator. The semiconductor device includes a substrate, a first waveguide disposed on the substrate, a second waveguide disposed on the substrate and spaced apart from the first waveguide by a first distance, and a heater disposed on the second waveguide and having a first terminal and a second terminal. In addition, the first terminal of the heater is configured to receive a first electrical signal; the second terminal of the heater is configured to receive a second electrical signal; and the heater is configured to carry a time-varying current in response to the first electrical signal and the second electrical signal.

20 Claims, 12 Drawing Sheets

(56) References Cited

U.S. PATENT DOCUMENTS

| | | | | |
|---|---|---|---|---|
| 2011/0293216 | A1* | 12/2011 | Lipson | G02B 6/13 |
| | | | | 438/31 |
| 2014/0139900 | A1* | 5/2014 | Shin | G02F 1/3133 |
| | | | | 359/245 |
| 2016/0248223 | A1* | 8/2016 | Blauvelt | H01S 5/0265 |
| 2018/0130629 | A1* | 5/2018 | Richardson | H03K 3/53 |
| 2019/0004342 | A1* | 1/2019 | Iida | G02F 1/0147 |

FOREIGN PATENT DOCUMENTS

| | | |
|---|---|---|
| CN | 112558220 A | 3/2021 |
| CN | 115867839 A | 3/2023 |
| CN | 115917408 A | 4/2023 |
| JP | 4556780 B2 | 10/2010 |
| TW | 201326934 A1 | 7/2013 |

OTHER PUBLICATIONS

U.S. Pat. No. 20200150344A1 is the US counterpart of CN 112558220 A.
U.S. Pat. No. 20120243825A1 is the US counterpart of CN 102667578 A.
U.S. Pat. No. 20150253510A1 is the US counterpart of CN 105492944 A.
U.S. Pat. No. 20230123000A1 is the US counterpart of CN 115867839 A.
U.S. Pat. No. 20130161496A1 is the US counterpart of TW 201326934 A.
English Abstract Translation of JP 4556780 B2.

* cited by examiner

SEMICONDUCTOR DEVICE, PHOTONIC CIRCUIT, AND METHOD FOR ADJUSTING RESONANT WAVELENGTH OF OPTICAL MODULATOR

BACKGROUND

The present disclosure relates to a semiconductor device, a photonic circuit, and a method for adjusting resonant wavelength of an optical modulator. In particular, the present disclosure relates to a photonic circuit including a heater driven by a time-varying current, and related semiconductor devices and methods.

Optical signaling and processing have become increasingly popular in recent years, particularly with the use of optical fiber-related applications for signal transmission. Accordingly, devices integrating optical components and electrical components are utilized in conversion of optical to electrical signals, and processing thereof. In the optical signaling field, optical modulators (for example, ring modulators or micro-ring modulators) are elements utilized for alleviation of process mismatch and calibration of the optical signals. The optical modulators may include a heater that thermally adjust the resonant wavelength. However, the heater may generate heat induced by large current, which may induce electromigration (EM) issues degrading reliability of the heater.

Electromigration (EM) occurs when electrical current runs through a conductive segment, wherein the momentum transfer between the conducting electrons and the metal atoms impels the metal atoms in the direction of the electron flow, shifting from their original positions and increasing non-uniformity of the conductive segment. Over time, EM may generate hillocks (accumulated excess metal) and/or voids (depleted original metal) in the conductive segment which may, in turn, result in short circuits (in the presence of hillocks) or open circuits (in the presence of voids).

Therefore, an improved optical modulator free from EM issues is called for, thereby reliability enhancement of the heater can be achieved.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1A:
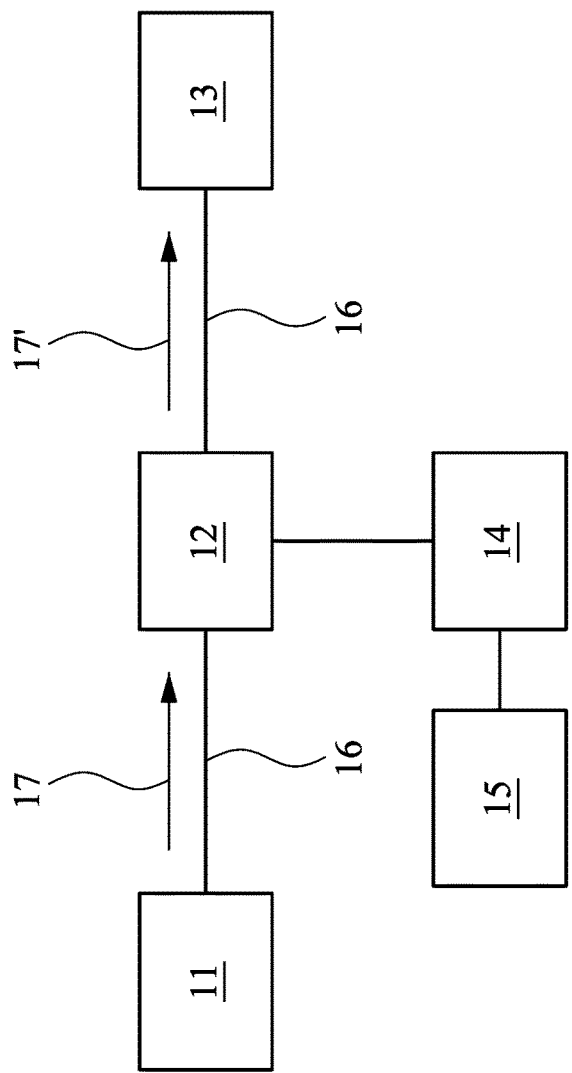
FIG. 1A is a block diagram of an optical communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above." "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1A is a block diagram of an optical communication system 10, in accordance with some embodiments. As shown in FIG. 1A, the optical communication system 10 includes an optical source 11, a modulator 12, a receiver 13, a driver 14, a processor 15 and waveguides 16. FIG. 1A also shows optical signals 17 and 17' transmitted within the optical communication system 10.

FIG. 1A illustrates how the optical source 11 may transmit an optical signal to the modulator 12 with which the optical signal 17 can be modulated to become the modulated optical signal 17', and the modulated optical signal 17' can be received by the receiver 13. The optical source 11, the modulator 12, and receiver 13 may be connected by the waveguides 16 (for example, optical fibers or optical conduits). In some embodiments, the optical source 11 may emit an optical signal 17. For example, the optical signal 17 can include laser beams and light beams. In some embodiments, the waveguides 16 may include optical fibers, optical waveguides, or optical conduits.

The optical communication system 10 may be part of the internal components of a computer system. For example, the optical communication system 10 may be part of, for example, a personal or laptop computer, with the modulator 12 included in a processor of the computer system and the receiver 13 included therein. The receiver 13 may be an internal card of the computer system, such as a video controller card, a network interface card, memory or the like. In one embodiment, the optical communication system 10 may be included in a single chip or chipset with the optical source 11 and the receiver 13 being internal components of the chip or chipset. In another embodiment, the optical communication system 10 may be included in a communications network with optical source 11 and receiver 13 being included in separate components of the communications network.

As will be discussed in further detail, the modulator 12 may include a waveguide disposed between p-type semiconductor materials and n-type semiconductor materials. In particular embodiments, these patterns may form discrete shapes from a light input end to a light output end of the waveguide. In one embodiment, the modulator 12 can be an optical modulator. For example, the modulator 12 can be a ring modulator (RM) or a micro-ring modulator.

In some embodiments, the driver 14 is electrically connected to the processor 15. The driver 14 can be configured to drive the modulator 12. In some embodiments, the optical source 11 may include a light source (e.g., a VCSEL diode). In some embodiments, the receiver 13 may include an amplifier and a photo detector (not shown in FIG. 1A). During optical communication between the optical source 11 and the receiver 13, the processor 15 may generate and transmit an electrical signal to the driver 14. Meanwhile, the driver 14 can control the modulator 12 based on the electrical signal generated by the processor 15, such that the optical signal 17 emitted from the optical source 11 through the waveguide 16 can be coupled to the modulator 12. In addition, the optical signal 17 irradiated onto the modulator 12 can be modulated to generate the optical signal 17'. The optical signal 17' generated by the modulator 12 is transmitted to and received by the receiver 13 through the waveguide 16. Subsequently, the receiver 13 may convert the optical signal 17' into a photo-current (another electrical signal) and the photo-current can be amplified by the amplifier. The amplified electrical signal can then be transmitted to other elements in the computer system.

Figure 1B:
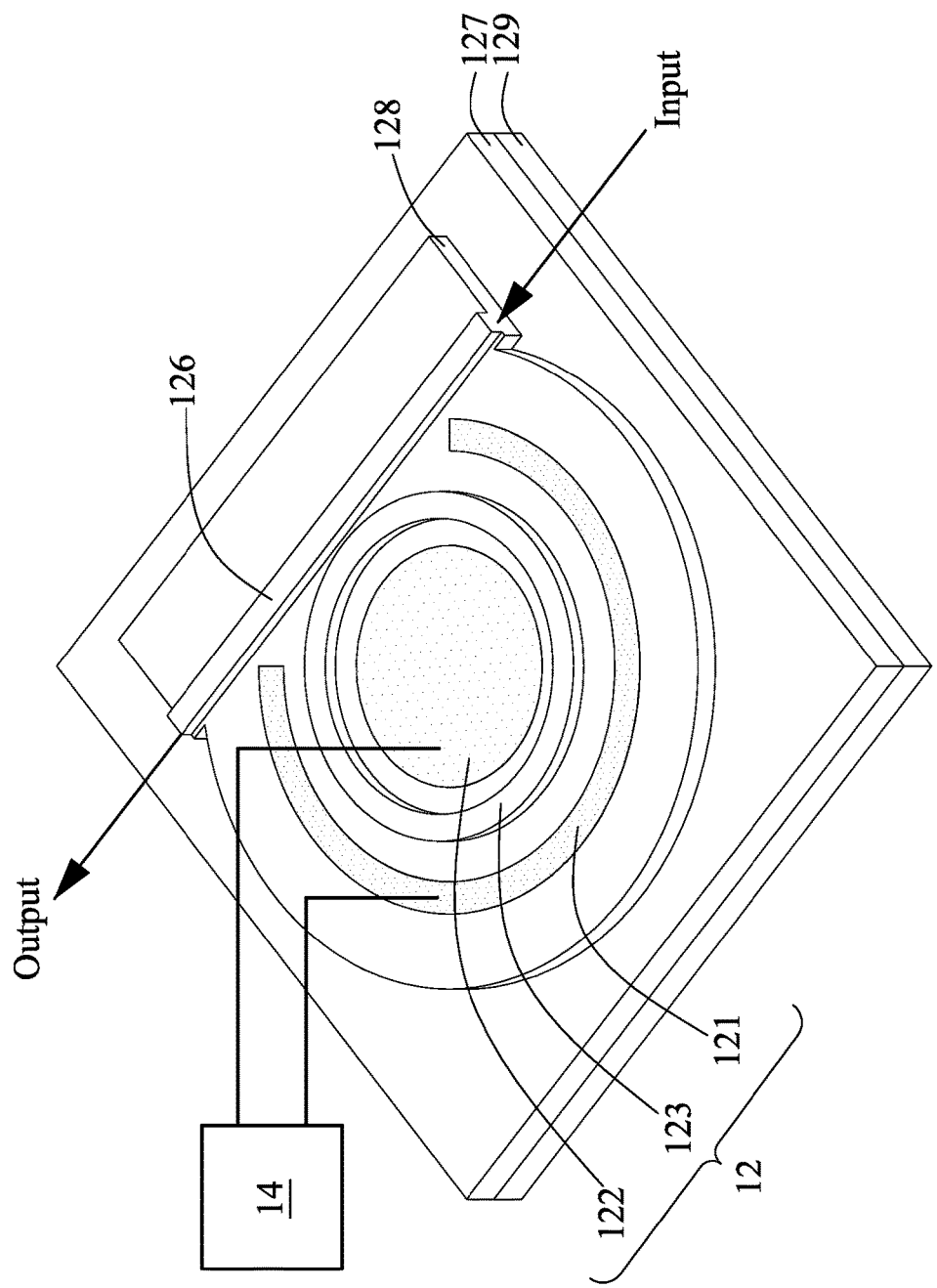
FIG. 1B is a schematic diagram of a semiconductor structure of a photonic device, in accordance with some embodiments.

FIG. 1B is a schematic diagram of a semiconductor structure 100 of a photonic device, in accordance with some embodiments. The semiconductor structure 100 can include a substrate 129, a dielectric layer 127, a semiconductor layer 128, a waveguide 126, a driver 14, and a modulator 12. In some embodiments, the modulator 12 can include waveguide (or optical coupling portion) 123 and electrical coupling portions 121 and 122. FIG. 1B shows modulator 12 coupled to the driver 14.

Referring to FIG. 1B, the semiconductor structure 100 includes the substrate 129. In some embodiments, the substrate 129 may be a silicon substrate, a silicon germanium substrate, or a substrate formed of other semiconductor materials. In some embodiments, the substrate 129 may be doped with p-type dopants (such as boron or BF2), n-type dopants (such as phosphorus or arsenic), or a combination thereof. Alternatively, the substrate 129 may be an intrinsic semiconductor substrate. In alternative embodiments, the substrate 129 is a dielectric substrate formed of, for example, silicon oxide.

The dielectric layer 127 can be disposed on the substrate 129. In some embodiments, a material of the dielectric layer 127 includes silicon oxide, silicon nitride, titanium oxide, or the like. In some embodiments, the dielectric layer 127 can constitute multiple dielectric layers.

The semiconductor layer 128 can be disposed on the dielectric layer 127. That is, the semiconductor layer 128 can be disposed on the substrate 129. In some embodiments, the dielectric layer 127 can be disposed between the semiconductor layer 128 and the substrate 129. In some embodiments, a material of the semiconductor layer 128 may be the same or different from that of the substrate 129. For example, the semiconductor layer 128 may be made of a suitable elemental semiconductor, such as crystalline silicon, diamond, or germanium, a suitable compound semiconductor, such as gallium arsenide, silicon carbide, indium arsenide, or indium phosphide, or a suitable alloy semiconductor, such as silicon germanium carbide, gallium arsenic phosphide, or gallium indium phosphide. In some embodiments, the semiconductor layer 128 can include the modulator 12 and the waveguide 126. As shown in FIG. 1B, the semiconductor layer 128 can be doped to form various regions, for example, the electrical coupling portions 121 and 122. In some embodiments, the optical coupling portion 123 can also be doped.

In some embodiments, the waveguide 126 can be disposed on the substrate 129. The waveguide 126 can be formed in the semiconductor layer 128. The waveguide 126 can have an input terminal and an output terminal. The input terminal of the waveguide 126 may be coupled to the optical source 11 as shown in FIG. 1A. In some embodiments, the output terminal of the waveguide 126 can be coupled to the receiver 13 shown in FIG. 1A. The optical signal (for example, the optical signal 17 as shown in FIG. 1A) generated by the optical source 11 can be received at the input terminal of the waveguide 126; transmitted through the waveguide 126; and then output at the output terminal of the waveguide 126.

The modulator 12 may include a waveguide. In some embodiments, the modulator 12 may include a curved waveguide. The modulator 12 can includes a ring profile. The modulator 12 can include the optical coupling portion 123 and the electrical coupling portions 121 and 122. In some embodiments, the modulator 12 may be disposed on the substrate 129 and adjacent to the waveguide 126. In some embodiments, the modulator 12 may be spaced apart from the waveguide 126 by a distance. The distance is small enough such that the optical signal in the waveguide 126 can be optically coupled to the modulator 12. In some embodiments, portions of the optical signal within a specific frequency/wavelength range in the waveguide 126 can be absorbed or refracted by the modulator 12, such that the optical signal can be modulated and output at the output terminal of the waveguide 126.

The optical coupling portion 123 of the modulator 12 can be annular or elliptical. In some embodiments, the optical coupling portion 123 can be spaced apart from the waveguide 126. In some embodiments, the optical coupling portion 123 can include a waveguide. In some embodiments, the optical coupling portion 123 can be doped with p-type dopants and/or n-type dopants. In another embodiment, the optical coupling portion 123 can be undoped or an intrinsic semiconductor.

In some embodiments, the electrical coupling portions 121 and 122 may be formed in the semiconductor layer 128. The semiconductor layer 128 can be doped to form the electrical coupling portions 121 and 122. In some embodiments, the electrical coupling portions 121 and 122 are disposed on the substrate 129. The electrical coupling portions 121 and 122 can be disposed adjacent to the optical coupling portion 123. In some embodiments, the optical coupling portion 123 is disposed between the electrical coupling portions 121 and 122.

In some embodiments, the semiconductor material in the electrical coupling portion 121 may be doped with dopants of first conductivity type. Meanwhile, the semiconductor material in the electrical coupling portion 122 may be doped with dopants of second conductivity type. In some embodiments, the first conductivity type is opposite to the second conductivity type. For example, the dopants of first conductivity type may be p-type dopants and the dopants of the second conductivity type may be n-type dopants. That is, the semiconductor material in the electrical coupling portion 121 can be doped with p-type dopants while the semiconductor material in the electrical coupling portion 122 is doped with n-type dopants. Nevertheless, the electrical coupling portion 121 can also be n-type doped, and the electrical coupling portion 122 can be p-type doped. In some embodiments, the p-type dopants include, for example, boron, BF2, or the like. On the other hand, the n-type dopants can include, for example, phosphorus, arsenic, or the like.

Referring to FIG. 1B, the driver 14 can be electrically coupled to the modulator 12. The driver 14 can apply a voltage to the electrical coupling portion 121. In some embodiments, the driver 14 can apply a voltage to the electrical coupling portion 122. That is, the modulator 12 can be configured to receive the voltage through the electrical coupling portions 121 and 122. With the applied voltage, a resonant wavelength or frequency of the modulator 12 can be adjusted to approach a predetermined value. A part of the optical signal in the waveguide 126 can be optically coupled to the modulator when the wavelength of the part of the optical signal is resonant with the modulator 12. Accordingly, the desired output optical signal at the output terminal of the waveguide 126 can be modulated by the modulator 12 absorbing a part of the optical signal.

Figure 2A:
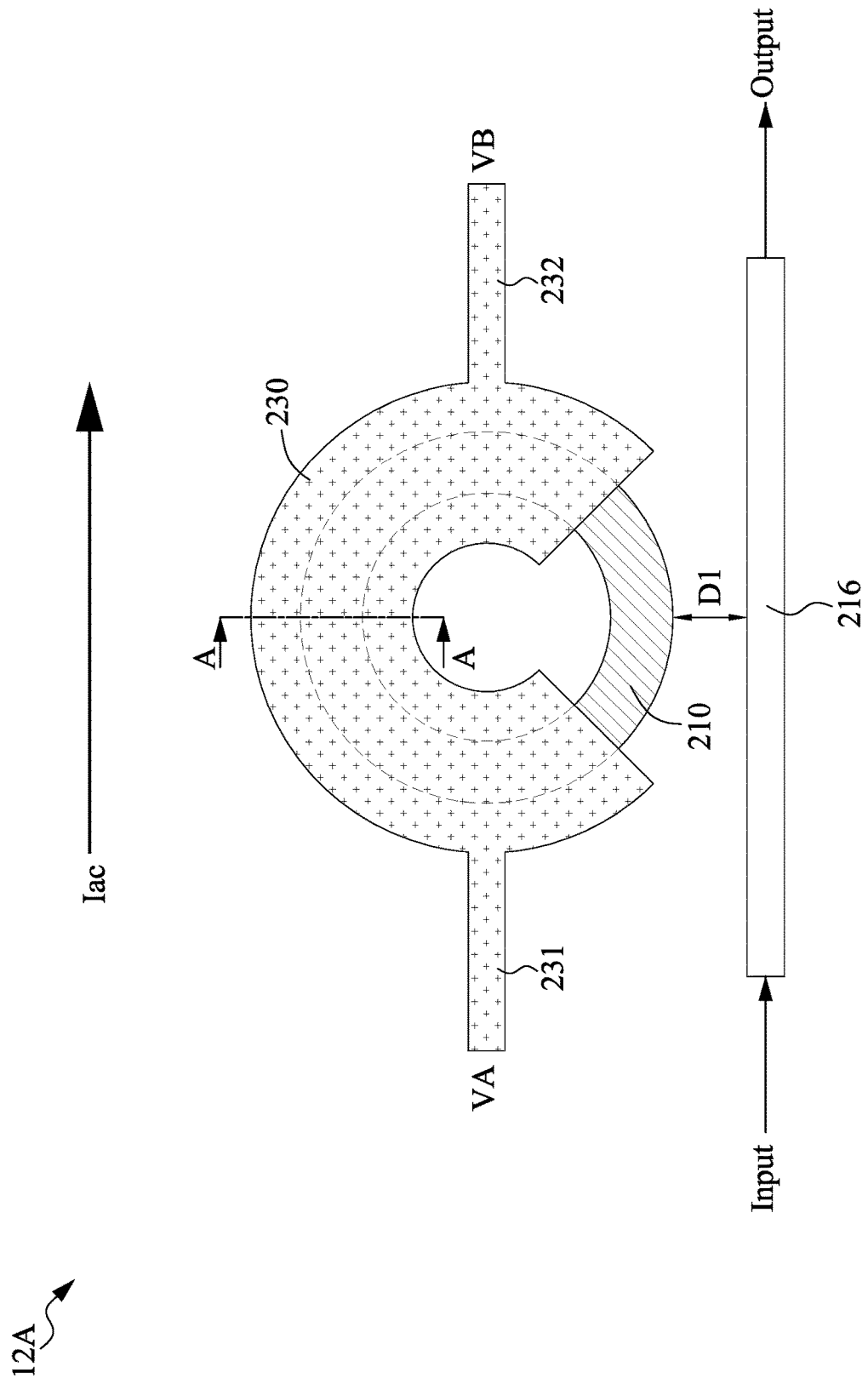
FIG. 2A is a top view of a photonic device, in accordance with some embodiments.

FIG. 2A is a top view of a photonic device, in accordance with some embodiments, including a modulator 12A and a waveguide 216. In some embodiments, the modulator 12A in FIG. 2A can correspond to the modulator 12 in FIG. 1B, and the waveguide 216 can correspond to the waveguide 126 in FIG. 1B. As shown in FIG. 2A, the modulator 12A can be spaced apart from the waveguide 216 by a distance D1. The distance D1 can be small enough to optically couple the optical signal in the waveguide 216 to the modulator 12A.

The modulator 12A may include a waveguide (or optical coupling portion) 210 and a heater 230. FIG. 2A includes a section line A-A, with details of the cross-section along the section line are presented in FIG. 2C.

Referring to FIG. 2A, the waveguide 216 can have an input terminal for receiving optical signal and an output terminal for transmitting the optical signal. In some embodiments, the waveguide 216 may be of a width (or diameter) in a range of 0.01 to 10 μm.

The modulator 12A includes a waveguide (optical coupling portion) 210. In some embodiments, the waveguide 210 can be a curved waveguide. In some embodiments, the waveguide 210 can be annular. In some embodiments, the waveguide 210 may be elliptical. The waveguide 210 may have a radius. When the radius of the waveguide 210 increases, the free spectral range (FSR) of the modulator 12A can decrease. Therefore, the power for modulating the resonant of the modulator 12A can be reduced. In other words, the power consumption of the modulator 12A can be reduced when the size of the modulator 12A increases.

In some embodiments, the waveguide 210 can be of a width (diameter) in a range of 0.01 to 10 μm. In one embodiment, the width of the waveguide 210 may exceed 1 μm. In some embodiments, the width of the waveguide 210 may be in a range of 1 to 10 μm. The process sensitivity of the modulator 12A can decrease as the width thereof increases. In other words, the stability of the modulator 12A may be improved as the width increases.

Referring to FIG. 2A, the modulator 12A may include a heater 230 disposed thereon. In some embodiments, the heater 230 can cover a portion of the waveguide 210. In some embodiments, the heater 230 can expose another portion of the waveguide 210. In some embodiments, the heater 230 can expose 5% to 55% of the waveguide 210. In some embodiments, the heater 230 can be fan-shaped, covering the waveguide 210. In some embodiments, the modulator 12A may include a dielectric layer (the dielectric layer 235 shown in FIG. 2C) between the heater 230 and the waveguide 210.

In some embodiments, the heater 230 can include two terminals 231 and 232. The terminal 231 of the heater 230 can be configured to receive a first electrical signal VA. The terminal 232 of the heater 230 can be configured to receive a second electrical signal VB. In some embodiments, the heater 230 can be configured to carry a time-varying current Iac in response to the first electrical signal VA and the second electrical signal VB. The term "carry" used in the present disclosure can be understood as the heater 230 being capable of for electrons or electron holes to transmit thereon. In some embodiments, the time-varying current Iac can flow through the heater 230 from the terminal 231 to the terminal 232 in a first time duration, in which the voltage level of the first electrical signal VA exceeds that of the second electrical signal VB. In some embodiments, the time-varying current Iac can be an alternative current (AC).

In some embodiments, the first electrical signal VA and the second electrical signal VB are opposite to each other. That is, the first electrical signal VA and the second electrical signal VB are AC signals. The details of the first electrical signal VA, the second electrical signal, and the time-varying current Iac will be discussed in FIGS. 4A-4D.

In some embodiments, the heater 230 can be configured to modulate the resonant wavelength of the modulator 12A thermally. The heater 230 can provide heat to the modulator 12A, so that the temperature thereof can be increased. In some embodiments, the modulator 12A can have a temperature coefficient about 0.07 nm/° C. For example, if the resonant wavelength of the modulator is 1312 nm at 27° C., the thermally modulated resonant wavelength may be 1312.7 nm at 37° C. With the higher temperature, the resonant wavelength can be modulated at a nanometer level. In some embodiments, the resonant wavelength (frequency) of the modulator 12A can be increased thermally as the temperature increases.

Figure 2B:
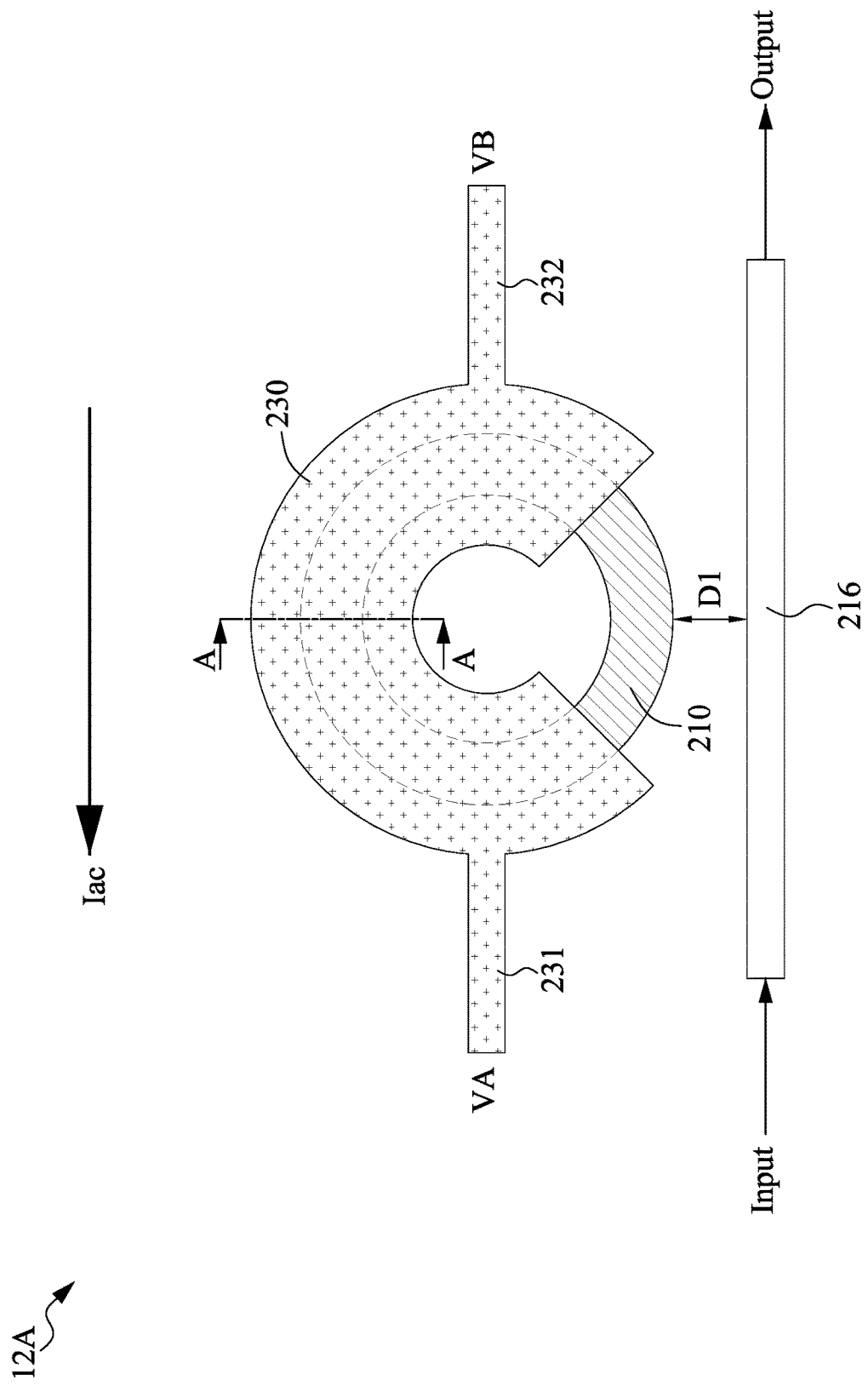
FIG. 2B is a top view of a photonic device, in accordance with some embodiments.

FIG. 2B is a top view of a photonic device, in accordance with some embodiments. FIG. 2B is similar to FIG. 2A, differing therefrom in that in FIG. 2B, the time-varying current Iac flows through the heater 230 in a different direction.

In some embodiments, the heater 230 can be configured to carry a time-varying current Iac in response to the first electrical signal VA and the second electrical signal VB. In some embodiments, the time-varying current Iac can flow through the heater 230 from the terminal 232 to the terminal 231 in a second time duration, in which the voltage level of the second electrical signal VB exceeds that of the first electrical signal VA. The details of the first electrical signal VA, the second electrical signal, and the time-varying current Iac will be discussed in FIGS. 4A-4D.

Referring to FIGS. 2A and 2B, using the AC signals to drive the heater 230, the current Iac passing through the heater 230 can flow toward left and right alternatingly. The electromigration occurring within the heater 230 can be eliminated accordingly. In addition, the current density passing through the heater 230 can decrease by using AC signals. Therefore, electromigration of the heater 230 can be prevented and the reliability of the heater 230 can be improved. The current Iac passing through the heater 230 can be the same as the previous practice, and thus the thermal efficiency of the heater 230 is not impacted.

Figure 2C:
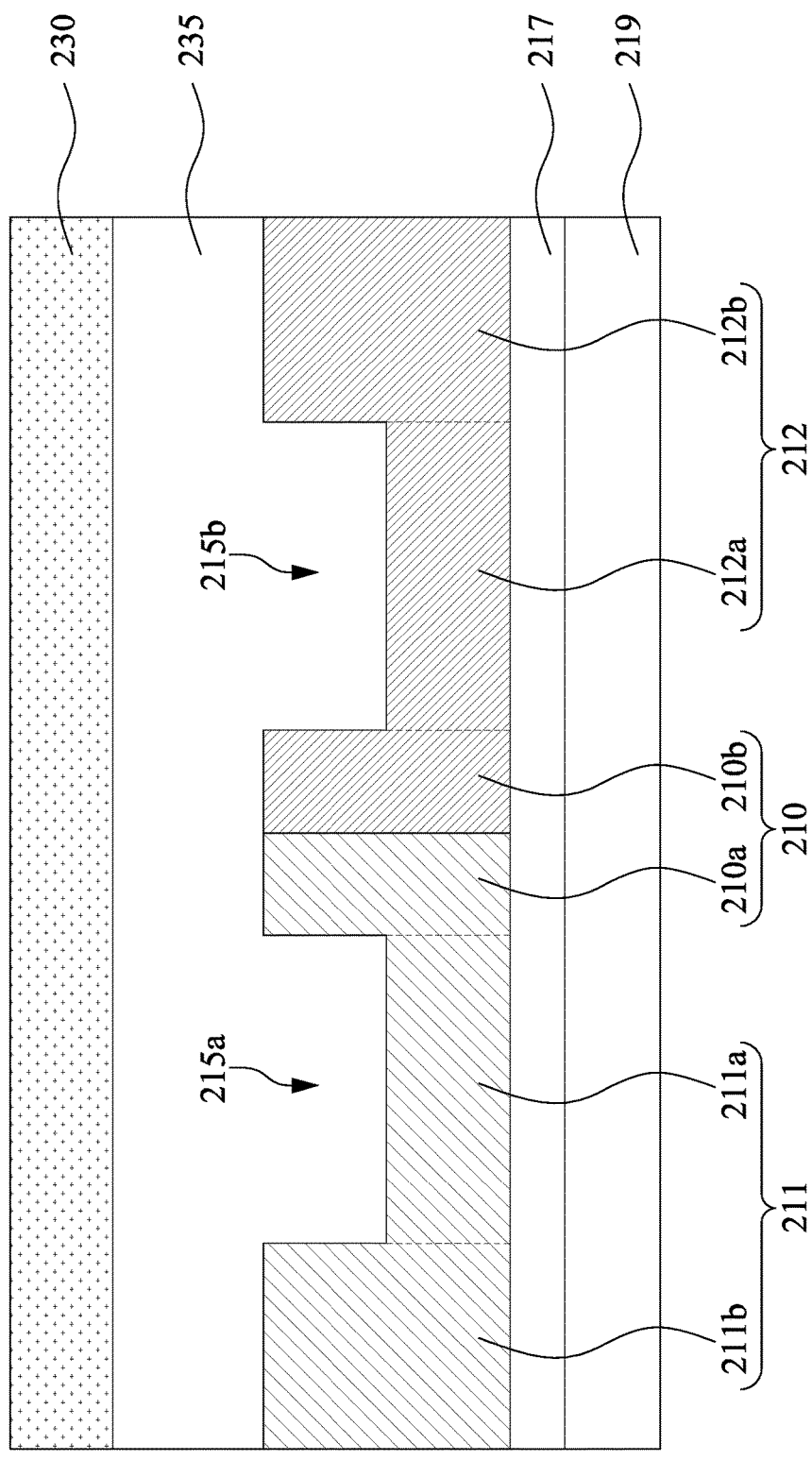
FIG. 2C is a cross-section of a photonic device along the section line A-A of FIGS. 2A and 2B, in accordance with some embodiments.

FIG. 2C is a cross-section of the photonic device along the section line A-A of FIGS. 2A and 2B. FIG. 2C includes a substrate 219, a dielectric layer 217, the waveguide 210, the electrical coupling portions 211 and 212, a dielectric layer 235, and a heater 230.

As shown in FIG. 2C, the dielectric layer 217 is disposed on the substrate 219. The substrate 219 is similar to the substrate 129 in FIG. 1B, and the dielectric layer 217 is similar to the dielectric layer 127 in FIG. 1B, and thus detailed description thereof is omitted for brevity.

The waveguide 210 can be disposed on the substrate 219. In some embodiments, the dielectric layer 217 can be disposed between the waveguide 210 and the substrate 219. The waveguide 210 can include two regions 210a and 210b. The region 210a can be disposed adjacent to the region 210b. In some embodiments, the regions 210a and 210b can be disposed side by side.

In one embodiment, the size of the region 210a can differ from that of the region 210b. For example, the width of the region 210a can exceed that of the region 210b. In another embodiment, the size of the region 210a can be identical to that of the region 210b. For example, the width of the region 210a can be substantially identical to that of the region 210b. In some embodiments, the height of the regions 210a and 210b can be the same. In some embodiments, the regions 210a and 210b have a total width, which can correspond to the width of the waveguide 210 in FIG. 2A.

In some embodiments, the regions 210a and 210b can have the same dopants doped therein. In other embodiments, the semiconductor material in the region 210a may be doped with dopants of a conductivity type. The semiconductor material in the region 210b of the waveguide 210 may be doped with dopants of a conductivity type, different from that of the region 210a. For example, the semiconductor material in the region 210a of the waveguide 210 can be doped with p-type dopants while the semiconductor material in the region 210b of the waveguide 210 can be doped with n-type dopants.

In some embodiments, the electrical coupling portion 211 can be disposed adjacent to the region 210a. That is, the region 210a may be disposed between the electrical coupling portion 211 and the region 210b. In some embodiments, the electrical coupling portion 212 can be disposed adjacent to the region 210b. That is, the region 210b may be disposed between the electrical coupling portion 212 and the region 210a. The electrical coupling portions 211 and 212 may correspond to the electrical coupling portions 121 and 122 in FIG. 1B, respectively. That is, the electrical coupling portions 211 and 212 can be doped with dopants of different conductivity types.

The electrical coupling portion 211 in FIG. 2C may include two regions 211a and 211b. In some embodiments, the region 211a can be disposed adjacent to the region 210a. The region 211b can be disposed adjacent to the region 211a of the electrical coupling portion 211. In some embodiments, the region 211a can be disposed between the region 211b and the region 210a. In one embodiment, the region 211b can be of a height different from that of the region 211a. For example, the height of the region 211b can exceed the height of the region 211a. The height of the regions 211a and 211b of the electrical coupling portion 211 is not limited. For example, the height of the region 211b may be substantially identical to the height of the region 211a. In some embodiments, the region 211b may be connected to the driver 14 (as shown in FIG. 1B).

In some embodiments, the semiconductor material of the regions 211a and 211b can be the same conductivity type. For example, the regions 211a and 211b can both be doped with p-type dopants. In one embodiment, the region 211a can have a doping concentration identical to that of the region 211b. In another embodiment, the doping concentration of the region 211a can be different from that of the region 211b. For example, the doping concentration of the region 211b can exceed the doping concentration of the region 211a. In some embodiments, the electrical coupling portion 211 can include one or more regions. In other words, the electrical coupling portion 211 can include several regions having different doping concentrations. In some embodiments, the doping concentration can decrease from the side of the electrical coupling portion 211 toward the waveguide 210. In some embodiments, the doping concentration can decrease gradually from the electrical coupling portion 211 toward the waveguide 210.

In some embodiments, the region 210a can be doped with dopants the same as in the regions 211a and 211b. In one embodiment, the region 210a can have a doping concentration substantially identical to that of the regions 211a and 211b. In another embodiment, the doping concentration of the region 210a can be different from that of the regions 211a and 211b. For example, the doping concentration of the region 210a can be less than that of the regions 211a and 211b. The p-type doping concentration can decrease from the region 211b toward the region 210a.

The electrical coupling portion 212 in FIG. 2C may include two regions 212a and 212C. In some embodiments, the region 212a can be disposed adjacent to the region 210b. In some embodiments, the region 212a can be disposed between the region 212C and the region 210b. In one embodiment, the region 212C can be of a height different from that of the region 212a. For example, the height of the region 212C can exceed the height of the region 212a. The height of the regions of the electrical coupling portion 212 is not limited. For example, the height of the region 212C may be substantially identical to the height of the region 212a. In some embodiments, the region 212C may be connected to the driver 14 (as shown in FIG. 1B). With the region 211b and the region 212C connected to the driver 14, the electrical signal can be transmitted through the region 211b, 211a, 210a, 210b, 212a, and 212C. That is, there can be a conductive path through the region 211b, 211a, 210a, 210b, 212a, and 212C, such that the resonant wavelength of the modulator 12A can be adjusted.

In some embodiments, the semiconductor material of the regions 212a and 212C can be the same conductivity type. For example, the regions 212a and 212C can be both doped with n-type dopants. In one embodiment, the region 212a can have a doping concentration identical to that of the region 212C. In another embodiment, the doping concentration of the region 212a can be different from that of the region 212C. For example, the doping concentration of the region 212C can exceed that of the region 212a. In some embodiments, the electrical coupling portion 212 can include one or more regions. In other words, the electrical coupling portion 212 can include several regions having different doping concentrations. In some embodiments, the doping concentration can decrease from the side of the electrical coupling portion 212 toward the waveguide 210. In some embodiments, the doping concentration can decrease gradually from the electrical coupling portion 212 toward the waveguide 210.

In some embodiments, the region 210b can be doped with dopants the same as in the regions 212a and 212C. In other words, the region 210b can be doped with n-type dopants. In one embodiment, the region 210b can have a doping concentration substantially identical to that of the region 212a. In another embodiment, the doping concentration of the region 210b can be different from that of the region 212a. For example, the doping concentration of the region 210b can be less than that of the region 212a. The n-type doping concentration can decrease from the region 212C toward the region 210b.

The region 211a and 211b of the electrical coupling portion 211 and the region 210a of the waveguide 210 can be p-type doped at different concentrations, while the region 212a and 212C of the electrical coupling portion 212 and the region 210b of the waveguide 210 can be n-type doped at different concentrations. That is, the regions 211a, 211b, and 210a and the regions 212a, 212C, and 210b can form a P-N junction.

Referring to FIG. 2C, the waveguide 210 and the regions 211b and 211a of the electrical coupling portion 211 can form a recess 215a. The height of the region 211a can be lower than the height of the region 211b and the region 210a of the waveguide 210. In some embodiments, the recess 215a is recessed from the top surface of the region 210a. The waveguide 210 and the regions 212C and 212a of the electrical coupling portion 212 can form a recess 215b. The height of the region 212a can be lower than the height of the region 212C and the region 210b of the waveguide 210. In some embodiments, the recess 215b is recessed from the top surface of the region 210b. In some embodiments, the level of the region 211a and the region 212a can be substantially the same.

In some embodiments, a dielectric layer 235 is disposed on waveguide 210 and the electrical coupling portions 211 and 212. The dielectric layer 235 can filled within the recesses 215a and 215b. In some embodiments, the dielectric layer 235 can contact the top surface of the waveguide 210, the regions 211a and 211b of the electrical coupling portion 211, and the regions 212a and 212C of the electrical coupling portion 212. In some embodiments, the dielectric layer 235 can have a top surface, which may be flattened. In some embodiments, the property and material of the dielectric layer 235 may be similar to the dielectric layer 217.

In some embodiments, the heater 230 can be disposed on the dielectric layer 235. The heater 230 can cover the waveguide 210. In some embodiments, the heater 230 can cover the waveguide 210 and the electrical coupling portions 211 and 212. The heater 230 can be a metal heater. For example, the heater 230 can generate heat induced by electrical current. The form and type of the heater 230 are not limited.

Figure 3A:
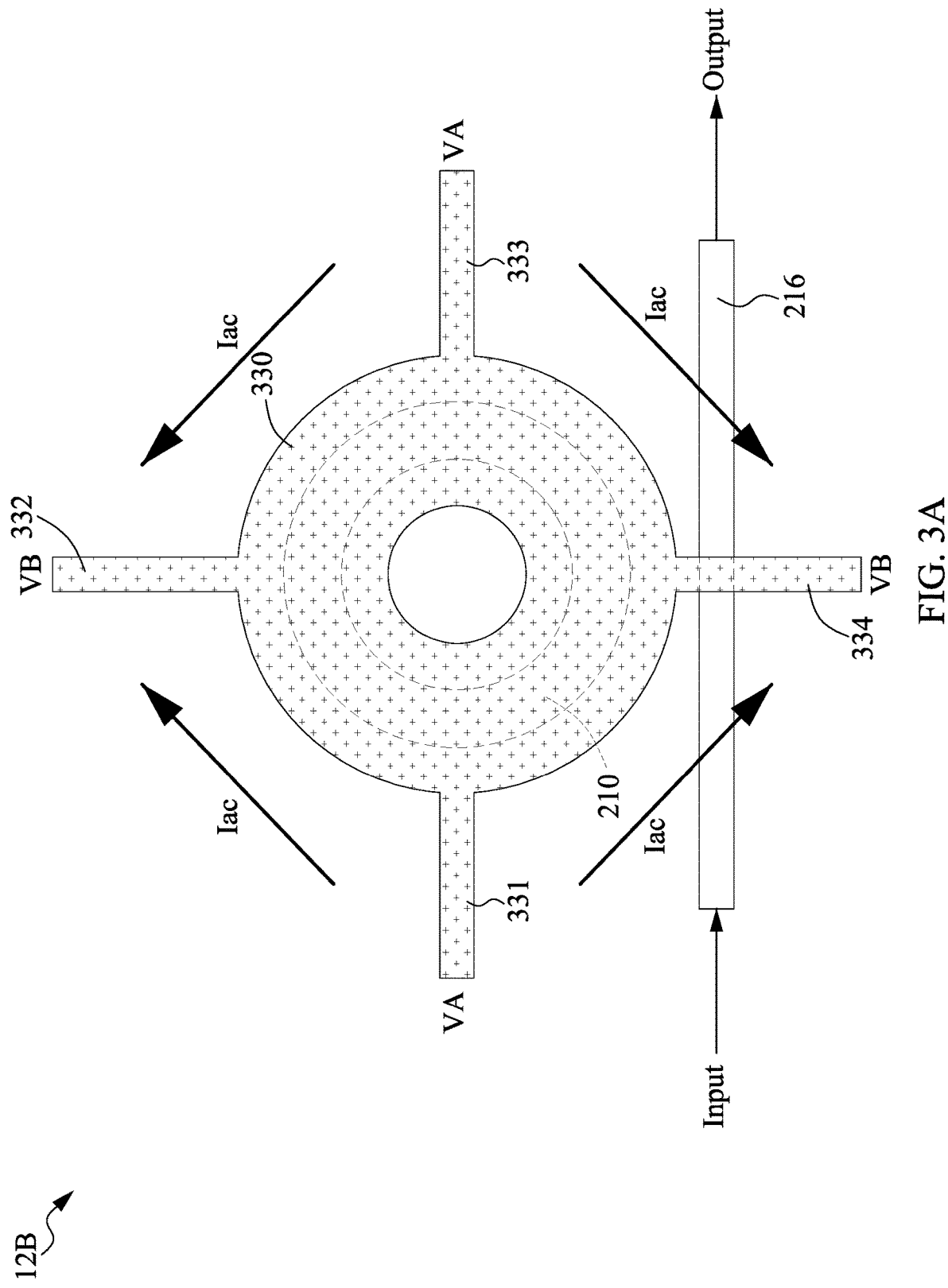
FIG. 3A is a top view of a photonic device, in accordance with some embodiments.

FIG. 3A is a top view of a photonic device, in accordance with some embodiments, in which the modulator 12B is similar to the modulator 12A in FIG. 2A, differing therefrom in that in FIG. 3A, the modulator 12B can have a heater 330 with four terminals 331, 332, 333, and 334 for receiving electrical signals. The modulator 12B can include a waveguide (or optical coupling portion) 210 and the heater 330 covering the waveguide 210. In some embodiments, the heater 330 can entirely cover the waveguide 210. In some embodiments, the heater 330 can have a shape conforming to the waveguide 210. For example, the heater 330 can be annular or elliptical.

In some embodiments, the terminal 331 of the heater 330 can be opposite to the terminal 333 of the heater 330. The terminals 331 and 333 both extend horizontally. The terminal 332 of the heater 330 can be opposite to the terminal 334 of the heater 330. The terminals 332 and 334 both extend vertically. In some embodiments, the terminals 331, 332, 333, and 334 can be equally distributed along the circumference of the heater 330. In some embodiments, the terminal 334 can cover a part of the waveguide 216.

The terminals 331 and 333 can be configured to receive a first electrical signal VA. The terminals 332 and 334 can be configured to receive a second electrical signal VB. In some embodiments, the heater 330 can be configured to carry a time-varying current Iac in response to the first electrical signal VA and the second electrical signal VB. In some embodiments, the time-varying current Iac can flow through the heater 330 from the terminal 331 to the terminals 332 and 334 in a first time duration, in which the voltage level of the first electrical signal VA exceeds that of the second electrical signal VB. Meanwhile, the time-varying current Iac can also flow through the heater 330 from the terminal 333 to the terminals 332 and 334 in the first time duration. The details of the first electrical signal VA, the second electrical signal, and the time-varying current Iac will be discussed in FIGS. 4A-4D.

Figure 3B:
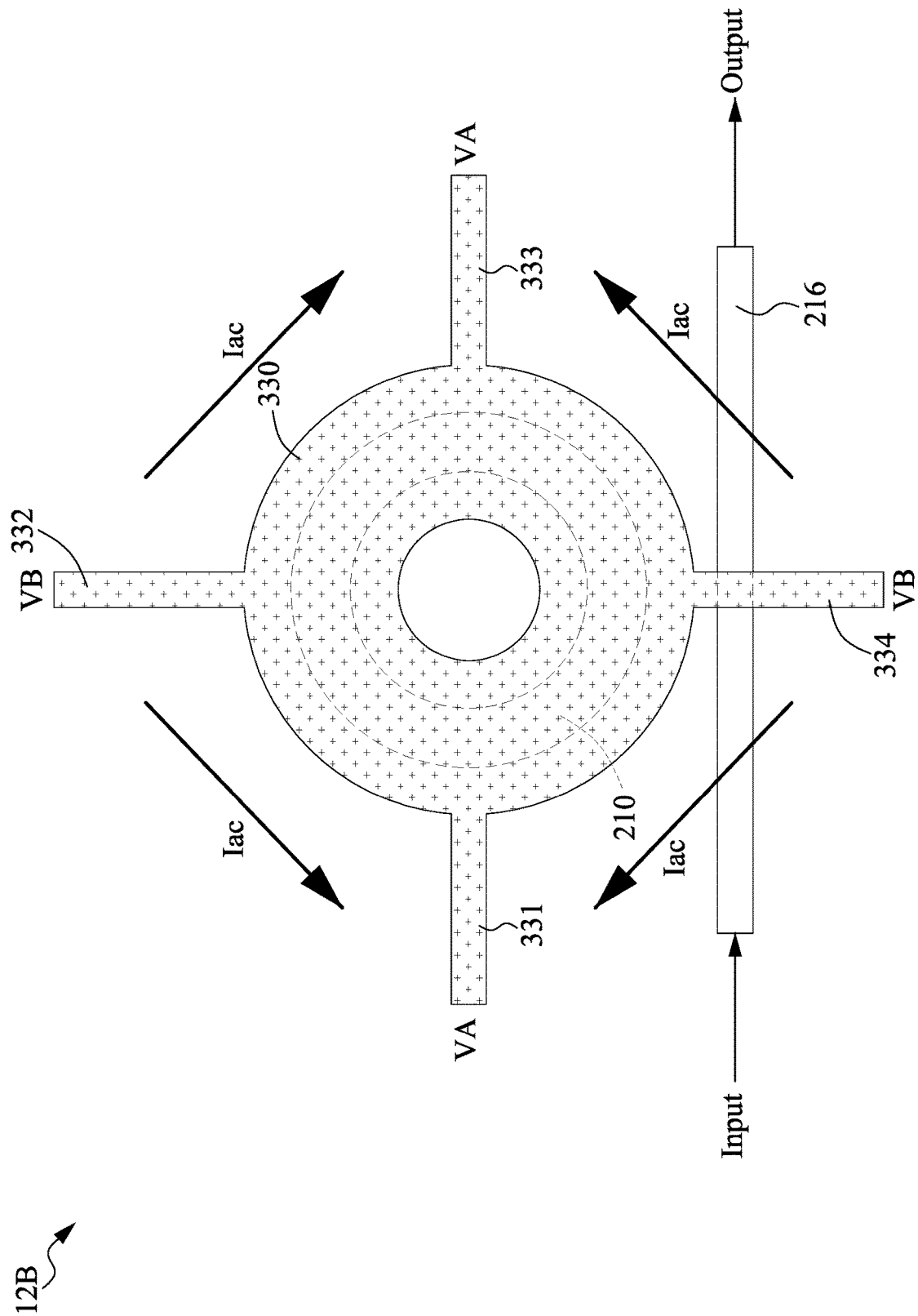
FIG. 3B is a top view of a photonic device, in accordance with some embodiments.

FIG. 3B is a top view of a photonic device, in accordance with some embodiments. FIG. 3B is similar to FIG. 3A, differing therefrom in that in FIG. 3B, the time-varying current Iac flow through the heater 330 in a different direction.

In some embodiments, the heater 330 can be configured to carry time-varying current Iac in response to the first electrical signal VA and the second electrical signal VB. In some embodiments, the time-varying current Iac can flow through the heater 330 from the terminal 332 to the terminals 331 and 333 in a second time duration, in which the voltage level of the second electrical signal VB exceeds that of the first electrical signal VA. Meanwhile, the time-varying current Iac can also flow through the heater 330 from the terminal 334 to the terminals 331 and 333 in the second time duration. The details of the first electrical signal VA, the second electrical signal, and the time-varying current Iac will be discussed in FIGS. 4A-4D.

In some embodiments, the number of terminals of the heater 330 can be more than four. The heater 330 can have one or more pairs of terminals. For example, the heater 330 can have 1, 2, 3, 4, 5, or more pairs of terminals (i.e., 2, 4, 6, 8, 10, or more terminals). Each of the one or more pairs of terminals includes one terminal for receiving the first electrical signal VA and another terminal for receiving the second electrical signal VB. In some embodiments, the one or more pairs of terminals can be arranged side by side along the circumference of the heater 330. That is, the terminal for receiving the first electrical signal VA can be between two terminals for receiving the second electrical signal VB. Similarly, the terminal for receiving the second electrical signal VB can be between two terminals for receiving the first electrical signal VA.

When the heater includes more terminals, the current passing through can be more uniform, and thus the thermal efficiency of the heater can be improved. Under the same voltage, the heater can generate more heat with more terminals.

Figure 4A:
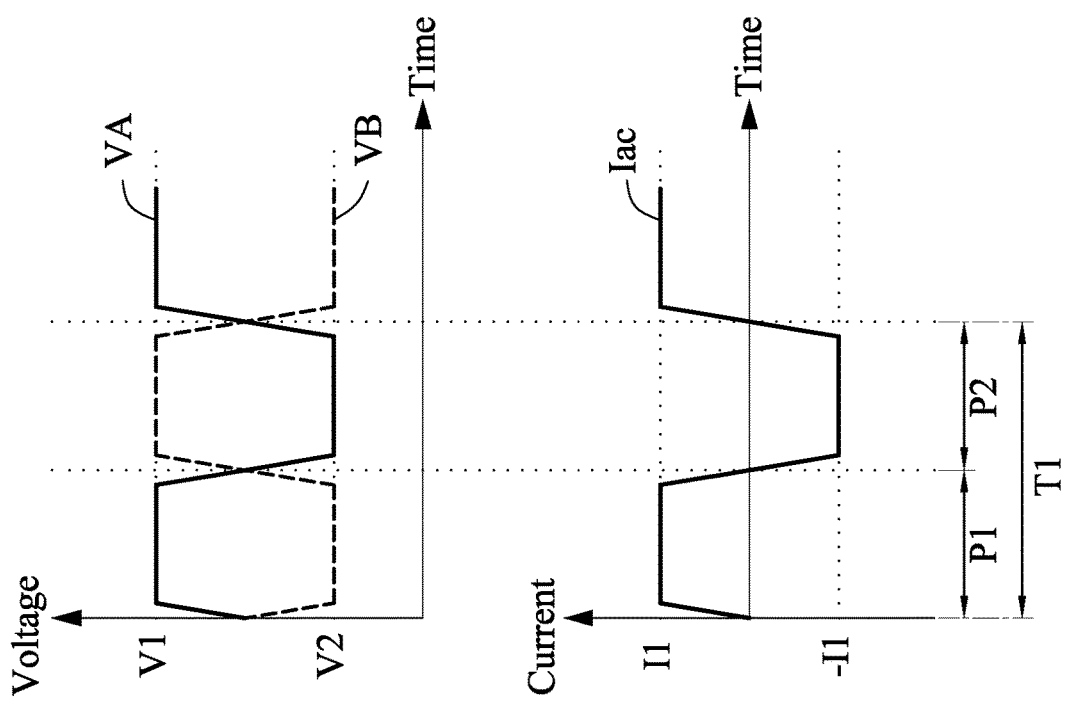
FIG. 4A is a waveform diagram of a signal for driving a heater, in accordance with some embodiments of the present disclosure.

FIG. 4A is a waveform diagram of a signal for driving a heater, in accordance with some embodiments of the present disclosure. FIG. 4A includes a voltage-time diagram and a current-time diagram of rectangular AC signals.

Referring to the voltage-time diagram of FIG. 4A, the first electrical signal VA and the second electrical signal VB are rectangular AC signals. In some embodiments, the first electrical signal VA and the second electrical signal VB can fluctuate between voltage levels V1 and V2. In some embodiments, the voltage level V1 is greater than the voltage level V2. The voltage level V1 can be in a range of 0.1V to 10V. The voltage level V2 can be in a range of 0V to 1V. For example, the first electrical signal VA and the second electrical signal VB can fluctuate between 0.1V and 10V.

In some embodiments, the first electrical signal VA can ramp up to the voltage level V1 at the beginning of a first duration P1, hold at the voltage level V1 in the first duration P1, and ramp down toward the voltage level V2 at the end of the first duration P1. The first electrical signal VA can ramp down to the voltage level V2 at the beginning of the second duration P2, hold at the voltage level V2, and ramp up toward the voltage level V1 at the end of the second duration P2.

The second electrical signal VB can ramp down to the voltage level V2 at the beginning of the first duration P1, hold at the voltage level V2 in the first duration P1, and ramp up toward the voltage level V1 at the end of the first duration P1. The second electrical signal VB can ramp up to the voltage level V1 at the beginning of the second duration P2, hold at the voltage level V1, and ramp down toward the voltage level V2 at the end of the second duration P2.

In some embodiments, the first electrical signal VA is opposite to the second electrical signal VB. For example, when the first electrical signal VA holds at the voltage level V1 in the first duration P1, the second electrical signal VB holds at voltage level V2.

In some embodiments, the first electrical signal VA can have a period T1, which may be substantially identical to the period of the second electrical signal VB. The period T1 can equal to a sum of the first duration P1 and the second duration P2. In some embodiments, the period T1 can be in a range of 1 ns to 1 ms.

Referring to the current-time diagram of FIG. 4A, the time-varying current Iac can be a rectangular AC signal. The time-varying current Iac can fluctuate between current values I1 and −I1. In some embodiments, the current value I1 is opposite to the current value −I1. That is, the current value −I1 is a negative value of the current value I1. The current values I1 and −I1 can be in a range of 1 μA to 1 A. For example, the time-varying current Iac can fluctuate between +1 mA and −1 mA.

In some embodiments, the time-varying current Iac can ramp up to the current value I1 at the beginning of the first duration P1, hold at the current value I1 in the first duration P1, and ramp down toward the current value −I1 at the end of the first duration P1. In some embodiments, the time-varying current Iac can ramp down to the current value −I1 at the beginning of the second duration P2, hold at the current value −I1, and ramp up toward the current value I1 at the end of the second duration P2.

In the duration P1, the time-varying current Iac can pass through the heater in the direction shown in FIG. 2A and FIG. 3A. On the contrary, in the duration P2, the time-varying current Iac can pass through the heater in the direction shown in FIG. 2B and FIG. 3B.

The first electrical signal VA and the second electrical signal VB can be applied to the heater (such as the heater 230 and 330) and drive the heater of the optical modulator to generate heat by large current Iac. The current Iac can pass through the heater in different directions alternatingly. The metal atoms impelled by the momentum transferring between the conducting electrons and the metal atoms can lightly shift from and substantially remain their original positions. The conductive segment can be uniformity, and thus the electromigration occurring within the heater can be eliminated accordingly. In addition, the current density passing through the heater can decrease by using AC signals. Hence, electromigration of the heater can be prevented and the reliability of the heater can be enhanced. The current Iac passing through the heater can be the same as the previous practice, and thus the thermal efficiency of the heater is not impacted.

Figure 4B:
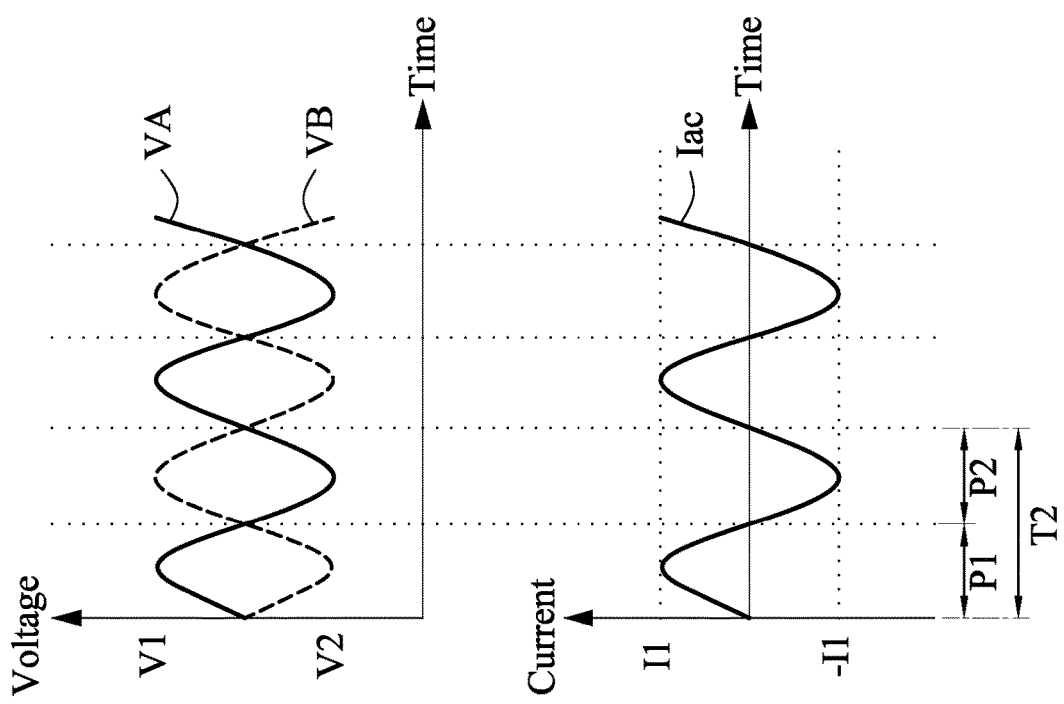
FIG. 4B is a waveform diagram of a signal for driving a heater, in accordance with some embodiments of the present disclosure.

FIG. 4B is a waveform diagram of a signal for driving a heater, in accordance with some embodiments of the present disclosure. FIG. 4B is similar to FIG. 4A, differing therefrom in that in FIG. 4B, the signal in the voltage-time diagram and the current-time diagram are sinusoid AC signals.

Figure 4C:
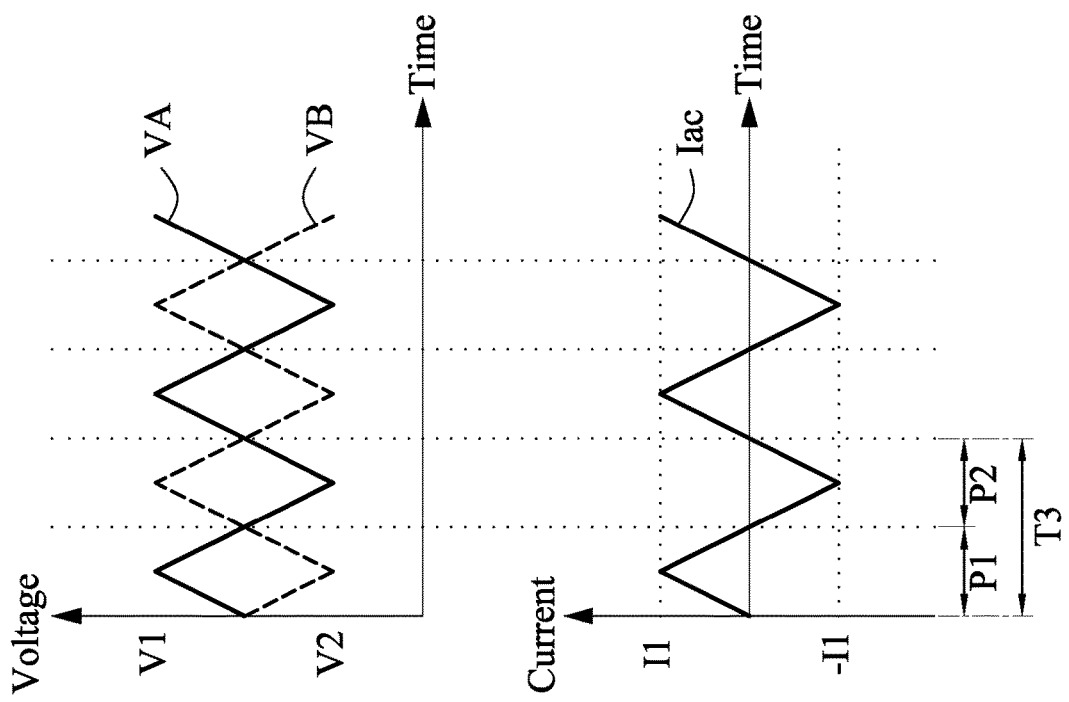
FIG. 4C is a waveform diagram of a signal for driving a heater, in accordance with some embodiments of the present disclosure.

FIG. 4C is a waveform diagram of a signal for driving a heater, in accordance with some embodiments of the present disclosure. FIG. 4C is similar to FIG. 4A, differing therefrom in that in FIG. 4C, the signal in the voltage-time diagram and the current-time diagram are triangle AC signals.

Figure 4D:
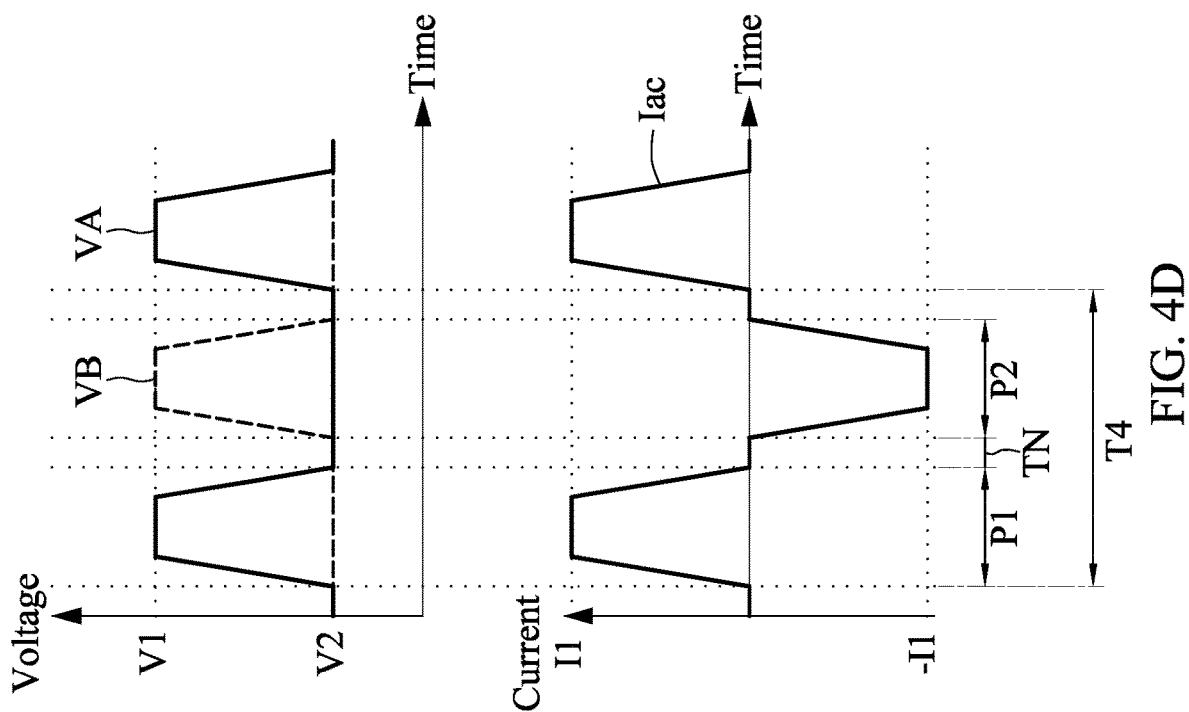
FIG. 4D is a waveform diagram of a signal for driving a heater, in accordance with some embodiments of the present disclosure.

FIG. 4D is a waveform diagram of a signal for driving a heater, in accordance with some embodiments of the present disclosure. FIG. 4D is similar to FIG. 4A, differing therefrom in that in FIG. 4D, the signal in the voltage-time diagram and the current-time diagram are non-overlapping AC signals.

Referring to the voltage-time diagram of FIG. 4D, the first electrical signal VA and the second electrical signal VB are one or more pulses. In some embodiments, each pulse of the first electrical signal VA does not overlap each pulse of the second electrical signal VB. In other words, the pulse of the first electrical signal VA is between two adjacent pulses of the second signal VB. Similarly, the pulse of the second electrical signal VB is between two adjacent pulses of the first signal VA. In some embodiments, the first pulse of the first electrical signal VA and the first pulse of the second electrical signal VB share a non-overlapped period TN, during which the first pulse of the first electrical signal VA and the first pulse of the second electrical signal VB include a predetermined voltage. For example, the predetermined voltage can be about the voltage level V2.

In some embodiments, the first electrical signal VA and the second electrical signal VB can fluctuate between voltage levels V1 and V2. In some embodiments, the voltage level V1 is greater than the voltage level V2.

In some embodiments, the first electrical signal VA can ramp up to the voltage level V1 at the beginning of the first duration P1, hold at the voltage level V1 in the first duration P1, and ramp down to the voltage level V2 at the end of the first duration P1. The first electrical signal VA can hold at the voltage level V2 in the first non-overlapped period TN following the first duration P1, the second duration P2, and the second non-overlapped period TN following the second duration P2.

In some embodiments, the second electrical signal VB can hold at the voltage level V2 in the first duration P1 and the first non-overlapped period TN following the first duration P1. The second electrical signal VB can ramp up to the voltage level V1 at the beginning of the second duration P2, hold at the voltage level V1 in the second duration P2, and ramp down to the voltage level V2 at the end of the second duration P2. The second electrical signal VB can hold at the voltage level V2 in the second non-overlapped period TN following the second duration P2.

In some embodiments, the first electrical signal VA is opposite to the second electrical signal VB. For example, when the first electrical signal VA holds at the voltage level V1 in the first duration P1, the second electrical signal VB would hold at the voltage level V2.

In some embodiments, the first electrical signal VA can have a period T4, from the starting point of the first pulse to the starting point of the second pulse of the first electrical signal VA. In some embodiments, the period of the second electrical signal VB may be substantially identical to the period T4. The period T4 can equal a sum of the first duration P1, the second duration P2, and two non-overlapped periods TN. In some embodiments, the period T4 can be in a range of 1 ns to 1 ms. In some embodiments, the non-overlapped period TN can be in a range of 1% to 10% of the period T4. In another embodiment, the non-overlapped period TN can be in a range of 5% to 10% of the period T4.

Referring to the current-time diagram of FIG. 4A, the time-varying current Iac can fluctuate between current values I1 and −I1.

In some embodiments, the time-varying current Iac can ramp up to the current value I1 at the beginning of the first duration P1, hold at the current value I1 in the first duration P1, and ramp down to a value of zero at the end of the first duration P1. The time-varying current Iac hold at the value of zero in the first non-overlapped period TN following the first duration P1. The time-varying current Iac can ramp down to the current value −I1 at the beginning of the second duration P2, hold at the current value −I1, and ramp up to the value of zero at the end of the second duration P2. The time-varying current Iac hold at the value of zero in the second non-overlapped period TN following the second duration P2.

In the duration P1, the time-varying current Iac can pass through the heater in the direction shown in FIG. 2A and FIG. 3A. On the contrary, in the duration P2, the time-varying current Iac can pass through the heater in the direction shown in FIG. 2B and FIG. 3B.

The non-overlapped period TN shares between the pulse of the first electrical signal VA and the pulse the second electrical signal VB, and thus the induced current Iac can be more stable. Accordingly, the reliability of the heater can be improved.

Figure 5:
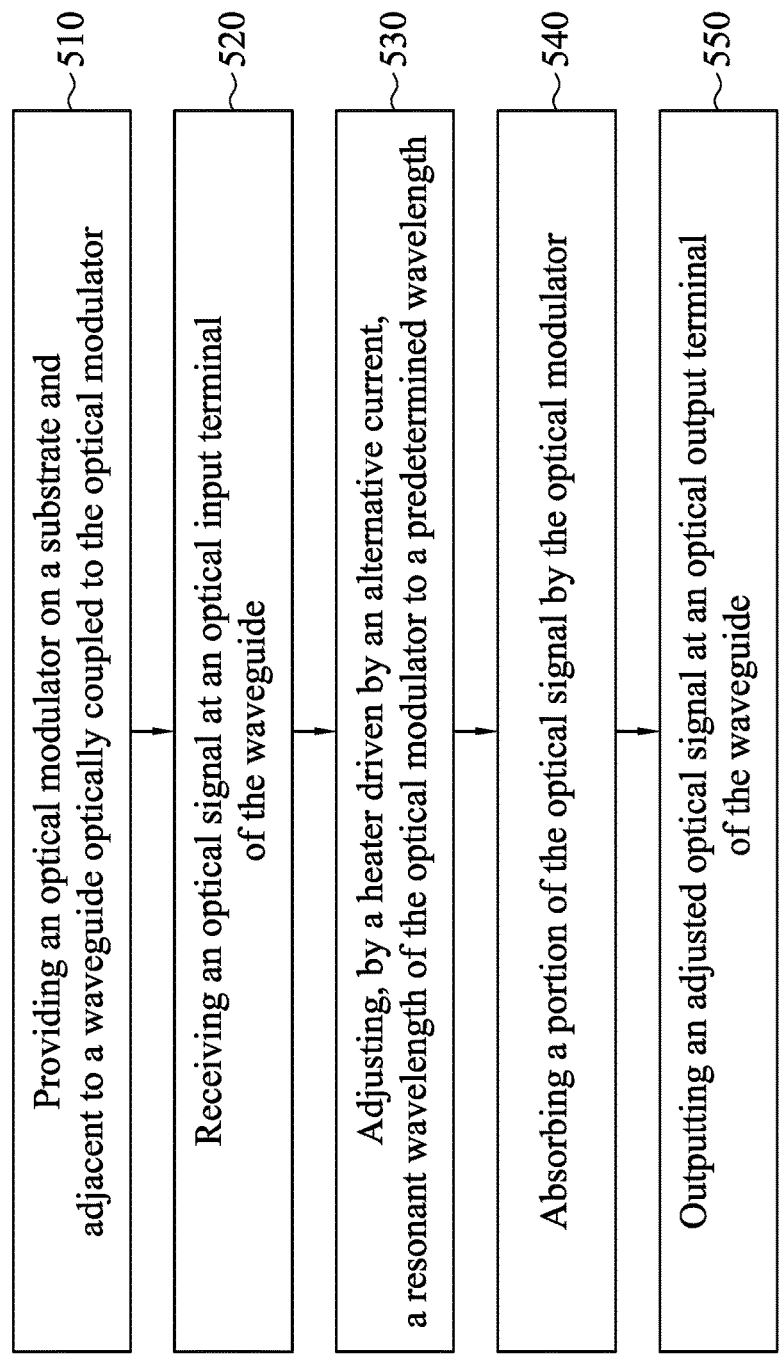
FIG. 5 is a flowchart showing a method for adjusting a resonant wavelength of an optical modulator, in accordance with some embodiments.

FIG. 5 is a flowchart 500 showing a method for adjusting a resonant wavelength of an optical modulator, in accordance with some embodiments of the present disclosure. In some embodiments, this method can be conducted by a semiconductor device. In some embodiments, this method can be conducted by a photonic circuit. In some embodiments, the method can be performed by the modulator shown in FIGS. 1B. 2A-2C, and 3A-3B.

In operation 510, the optical modulator is provided on a substrate and adjacent to a waveguide optically coupled to the optical modulator. In some embodiments, the waveguide includes an optical input terminal and an optical output terminal.

In operation 520, an optical signal can be received at the optical input terminal of the waveguide. In some embodiments, the optical signal can be transmitted through the waveguide.

In operation 530, the resonant wavelength of the optical modulator can be adjusted to a predetermined wavelength by a heater driven by an alternative current. In some embodiments, the heater can be the heater 230 in FIGS. 2A-2C and the heater 330 in FIGS. 3A and 3B. The predetermined waveguide can be determined by need.

In operation 540, a portion of the optical signal can be absorbed by the optical modulator. When the wavelength of the portion of the optical signal corresponds to the resonant wavelength of the optical modulator, the portion of the optical signal can be optically coupled to the optical modulator.

In operation 550, an adjusted optical signal can be output at the optical output terminal of the waveguide. Since a portion of the optical signal is optically coupled to the optical modulator, the adjusted optical signal would lack such portion of optical signal. Therefore, the adjusted optical signal can be adjusted to be the desired signal (light) output at the optical output terminal of the waveguide.

According to some embodiments, a semiconductor device is provided. The semiconductor device includes a substrate, a first waveguide disposed on the substrate, a second waveguide disposed on the substrate and spaced apart from the first waveguide by a first distance, and a heater disposed on the second waveguide and having a first terminal and a second terminal. In addition, the first terminal of the heater is configured to receive a first electrical signal; the second terminal of the heater is configured to receive a second electrical signal; and the heater is configured to carry a time-varying current in response to the first electrical signal and the second electrical signal.

According to other embodiments, a photonic circuit is provided. The photonic circuit includes a first waveguide, a second waveguide disposed on the substrate and separated apart from the first waveguide, and a heater disposed on the second waveguide and including one or more pairs of terminals. In addition, each of the one or more pairs of terminals includes a first terminal and a second terminal. The first terminal of the heater is configured to receive a first electrical signal and the second terminal of the heater is configured to receive a second electrical signal, such that an alternative current passing through the heater from the first terminal to the second terminal in a first time duration and from the second terminal to the first terminal in a second time duration, and wherein the first electrical signal has a frequency identical to that of the second electrical signal.

According to other embodiments, a method for adjusting a resonant wavelength of an optical modulator. The method includes providing the optical modulator on a substrate and adjacent to a waveguide optically coupled to the optical modulator, wherein the waveguide includes an optical input terminal and an optical output terminal; receiving an optical signal at the optical input terminal of the waveguide; adjusting, by a heater driven by an alternative current, the resonant wavelength of the optical modulator to a predetermined wavelength; absorbing a portion of the optical signal by the optical modulator; and outputting an adjusted optical signal at the optical output terminal of the waveguide.

The methods and features of the present disclosure have been sufficiently described in the examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods, and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A semiconductor device, comprising:
    a substrate;
    a first waveguide disposed on the substrate;
    a second waveguide disposed on the substrate and spaced apart from the first waveguide by a first distance; and
    a heater disposed on the second waveguide and having a first terminal and a second terminal, wherein
    the first terminal of the heater is configured to receive a first electrical signal;
    the second terminal of the heater is configured to receive a second electrical signal;
    the heater is configured to carry a time-varying current in response to the first electrical signal and the second electrical signal; and
    the first electrical signal includes a first pulse and the second electrical signal includes a second pulse, and wherein the first pulse and the second pulse share a non-overlapped period during which the first pulse and the second pulse include a predetermined voltage.

2. The semiconductor device of claim 1, further comprising a dielectric layer disposed between the heater and the second waveguide.

3. The semiconductor device of claim 2, wherein the second waveguide has at least one recess from a cross-sectional view perspective, and wherein the dielectric layer fills the at least one recess of the second waveguide.

4. The semiconductor device of claim 1, wherein the heater covers a portion of the second waveguide from a top view perspective.

5. The semiconductor device of claim 1, wherein the time-varying current flows through the heater from the first terminal to the second terminal in a first time duration, and flows through the heater from the second terminal to the first terminal in a second time duration.

6. The semiconductor device of claim 1, wherein the heater further includes a third terminal and a fourth terminal, wherein the first terminal is opposite to the third terminal and the second terminal is opposite to the fourth terminal, wherein the third terminal is configured to receive the first electrical signal and the fourth terminal is configured to receive the second electrical signal.

7. The semiconductor device of claim 1, wherein the first electrical signal is one of a rectangular AC signal, a sinusoid AC signal or a triangle AC signal.

8. The semiconductor device of claim 1, wherein the non-overlapped period is in a range of 1% to 10% of a period of the first electrical signal.

9. The semiconductor device of claim 1, wherein the second waveguide includes a ring profile from a top view perspective, and wherein the heater covers a first portion of the second waveguide and exposes a second portion of the second waveguide from the top view perspective.

10. The semiconductor device of claim 1, wherein the second waveguide has a width in a range of 0.01 to 10 μm.

11. A photonic circuit, comprising:
    a first waveguide; and
    a second waveguide spaced apart from the first waveguide; and
    a heater disposed on the second waveguide and including one or more pairs of terminals, wherein each of the one or more pairs of terminals includes a first terminal and a second terminal,
    wherein the first terminal of the heater is configured to receive a first electrical signal and the second terminal of the heater is configured to receive a second electrical signal, such that an alternative current passing through the heater from the first terminal to the second terminal in a first time duration and from the second terminal to the first terminal in a second time duration, and wherein the first electrical signal includes a first pulse and the second electrical signal includes a second pulse, and wherein the first pulse and the second pulse share a non-overlapped period during which the first pulse and the second pulse include a predetermined voltage.

12. The photonic circuit of claim 11, wherein the heater covers a portion of the second waveguide from a top view perspective.

13. The photonic circuit of claim 11, further comprising a dielectric layer disposed between the heater and the second waveguide, wherein the second waveguide includes at least one recess from a cross-sectional view perspective, and wherein the dielectric layer is within the at least one recess of the second waveguide.

14. The photonic circuit of claim 11, wherein the first electrical signal is one of a rectangular AC signal, a sinusoid AC signal or a triangle AC signal.

15. The photonic circuit of claim 1, wherein the non-overlapped period is in a range of 1% to 10% of a period of the first electrical signal.

16. The photonic circuit of claim 11, wherein the first electrical signal has a frequency identical to that of the second electrical signal.

17. The photonic circuit of claim 11, wherein the second waveguide includes a ring profile from a top view perspective, and wherein the heater covers a first portion of the second waveguide and exposes a second portion of the second waveguide from the top view perspective.

18. A method for adjusting a resonant wavelength of an optical modulator, comprising:

providing the optical modulator on a substrate and adjacent to a waveguide optically coupled to the optical modulator, wherein the waveguide includes an optical input terminal and an optical output terminal;

receiving an optical signal at the optical input terminal of the waveguide;

adjusting, by a heater driven by an alternative current, the resonant wavelength of the optical modulator to a predetermined wavelength;

absorbing a portion of the optical signal by the optical modulator; and outputting an adjusted optical signal at the optical output terminal of the waveguide, wherein the heater has a first terminal and a second terminal, wherein the first terminal of the heater is configured to receive a first electrical signal and the second terminal of the heater is configured to receive a second electrical signal, such that the alternative current passing through the heater from the first terminal to the second terminal in a first time duration and from the second terminal to the first terminal in a second time duration, and wherein the first electrical signal includes a first pulse and the second electrical signal includes a second pulse, and wherein the first pulse and the second pulse share a non-overlapped period during which the first pulse and the second pulse include a predetermined voltage.

19. The method of claim 18, wherein the first electrical signal is one of a rectangular AC signal, a sinusoid AC signal or a triangle AC signal.

20. The method of claim 18, wherein the non-overlapped period is in a range of 1% to 10% of a period of the first electrical signal.

* * * * *